United States Patent [19]
Dumoulin

[11] 3,926,896
[45] Dec. 16, 1975

[54] ORGANOSILICON COMPOSITIONS FOR THE NON-STICK COATING OF CELLULOSIC OR SYNTHETIC MATERIALS

[75] Inventor: Jean Dumoulin, Villeurbanne, France

[73] Assignee: Rhone-Poulenc, S.A., Paris, France

[22] Filed: Mar. 18, 1974

[21] Appl. No.: 452,388

[30] Foreign Application Priority Data
Mar. 21, 1973 France.............................. 73.10098

[52] U.S. Cl...................... 260/31.2 R; 260/32.8 SB; 260/33.6 SB; 260/37 SB
[51] Int. Cl.²........................................... C08K 5/10
[58] Field of Search.. 260/31.2 R, 32.8 SB, 33.6 SB; 117/155 R

[56] References Cited
UNITED STATES PATENTS

| | | | |
|---|---|---|---|
| 3,527,659 | 9/1970 | Keil | 260/825 X |
| 3,671,485 | 6/1972 | Marwitz et al. | 260/33.6 SB X |
| 3,779,986 | 12/1973 | Smith et al. | 260/32.8 SB X |

*Primary Examiner*—Lewis T. Jacobs
*Attorney, Agent, or Firm*—Stevens, Davis, Miller & Mosher

[57] ABSTRACT

Non-stick coating compositions are provided which are capable of being applied to a very wide range of substrates and which are stable in the atmosphere for 24 hours, the compositions being based on a dimethylpolysiloxane polymer and containing, per 100 parts by weight of the polymer, 1 to 15 parts of a silicate ester which is selected from an alkoxyalkyl silicate of the formula:

$Si[(OCH_2CH_2)_aOR]_4$ in which R represents an alkyl radical with 1 to 4 carbon atoms and $a$ is 1 or 2, and a cyclic silicate of the formula:

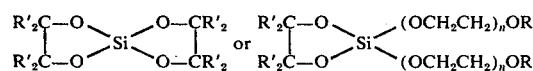

in which each R', which may be identical or different, represents an alkyl group with 1 to 5 carbon atoms or a vinyl group, $n$ is zero or 1 and R is as defined above and 5 to 25 parts of an organic derivative of titanium which is selected from an alkyl polytitanate, which is soluble in hydrocarbon solvents, having the average general formula $Ti_bO_c(OR'')_d$ in which R'' represents an alkyl group with 3 to 8 carbon atoms, $b$ represents an integer of at least 2, $c$ represents an integer of at least 1 and $d$ represents an integer of at least 4, and a mixture consisting of at least 5 percent of a said aklyl polytitanate with an alkyl titanate, the alkyl group having 3 to 10 carbon atoms, and/or a titanium chelate.

5 Claims, No Drawings

ORGANOSILICON COMPOSITIONS FOR THE NON-STICK COATING OF CELLULOSIC OR SYNTHETIC MATERIALS

This invention relates to organosilicon compositions which are stable for at least 24 hours in contact with the atmosphere, and which can be used, in particular on high yield industrial machines, for coating a variety of substrates; the coatings formed by drying these compositions, deposited in thin layers, for a few seconds at a temperature above 60°C, possess desirable non-stick properties with respect to sticky and viscous substances which normally stick to such substrates.

Numerous compositions have already been described for the non-stick coating of cellulosic or synthetic materials which are generally in the form of sheets or films (see, for example, French Pat. Nos. 1,226,745, 1,237,633, 1,526,681, 1,595,718 and 2,051,399); some of them after they have been dried for a few seconds at 70°–160°C, make it possible to impart the desired non-stick properties to these materials (see, for example, French Pat. Nos. 1,492,531, 2,026,131 and 1,572,724). However, these compositions need to be improved so that their use on high yield industrial coating machines can be extended, since the users of these machines want the compositions to possess, in addition to the abovementioned properties, firstly, stability for at least 24 hours in the atmosphere in the coating tanks, even in the presence of impurities originating, for example, from the corrosion of the walls of the pipes supplying these tanks or from poor cleaning of the machines, and, secondly, the capacity to give rise to non-stick coatings on any type of support regardless of whether it is a more or less porous fibrous material, a woven material, a non-woven material, an extruded material or a smooth material.

The present invention provides organosilicon compositions which combine all the properties necessary for effective use on industrial machines for coating any type of material. According to the present invention, there is provided a composition produced by mixing the following ingredients, parts and percentages being by weight:

i. 100 parts of a dimethylpolysiloxane polymer chosen from amongst:
  a. a $\alpha, \omega$-dihydroxydimethylpolysiloxane gum of viscosity at least 1 million centipoises (cPo) at 25°C, and
  b. mixtures consisting of at least 75% of such gums and dimethylpolysiloxane polymer of low molecular weight which is formed during the preparation of such gums by polymerisation of dimethylcyclopolysiloxanes by means of alkaline or acid catalysts.

ii. 1 to 15 parts of at least one silicate ester, iii. 5 to 25 parts of at least one organic derivative of titanium, iv. 0.3 to 8 parts of a catalyst which is an organic derivative of tin, a metal salt of a carboxylic acid or a polymer possessing recurring units of the formula:

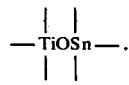

and v. 500 to 5,000 parts of organic solvent.

These compositions are characterised in that the silicate ester of component (ii), is:

c. an alkoxyalkyl silicate of the formula $Si[(OCH_2CH_2)_aOR]_4$ in which R represents an alkyl radical with 1 to 4 carbon atoms and a is 1 or 2, or d. a cyclic silicate of the formula:

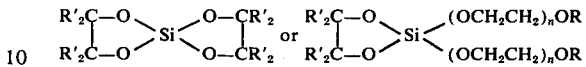

in which each R', which may be identical or different, represents an alkyl group with 1 to 5 carbon atoms or a vinyl group, n is zero or 1 and R is as defined above, and the organic derivative of titanium of component (iii) is:

e. an alkyl polytitanate, which is soluble in hydrocarbon solvent, of the average general formula: $Ti_bO_c(OR'')_d$ in which R'' represents an alkyl group with 3 to 8 carbon atoms, the symbol b represents an integer of at least 2, the symbol c represents an integer of at least 1 and the symbol d represents an integer of at least 4, and f. a mixture consisting of at least 5% of the above alkyl polytitanate and an alkyl titanate, the alkyl group having 3 to 10 carbon atoms, and/or a titanium chelate.

The $\alpha,\omega$-dihydroxydimethylpolysiloxane gums which can be used in the compositions according to the present invention consist mainly of units of the formula $(CH_3)_2SiO$-, but units of the formulae: $-CH_3(CH_2=CH)SiO-$ and/or $-CH_3SiO_{1.5}$ can be present in an amount up to 2 percent by number. The techniques for the manufacture of these gums are well known. In a first stage, dimethylcyclopolysiloxanes are polymerised by means of a catalytic amount of an alkaline or acid agent and then the polymerisates are treated with calculated amounts of water (see, for example, French Pat. Nos. 1,198,749, 1,134,005 and 1,226,745). Thereafter, in a second stage, these gums are isolated by removing, generally at a temperature above 100°C under a pressure less than atmospheric pressure, the starting dimethylcyclopolysiloxanes which take part in equilibrium reactions during the polymerisation, as well as the products of rather low molecular weight formed during this reaction. Such volatile dimethylpolysiloxane polymers represent at most 25 percent of the polymerisate.

These gums can, however, also be used in the compositions of this invention without being isolated, that is to say mixed with the volatile polymers; this is an advantage since the rather laborious devolatilisation stage can be dispensed with and since, moreover, the presence of volatile materials facilitates the dissolution of the gums and improves their compatibility with the other ingredients.

The catalysts, which are used in an amount from 0.3 to 8 parts, preferably 0.5 to 6 parts, per 100 parts of dimethylpolysiloxane polymers, may be:

(1) organic derivatives of tin such as:

organo-tin salts of mono- or poly-carboxylic acids, such as dibutyl-tin or dioctyl-tin dilaurate, dibutyl-tin or dioctyl-tin di-(2-ethyl-hexanoate), tributyl-tin 2-ethyl-hexanoate, dibutyl-tin succinate and dioctyl-tin maleate, and compounds of the formula $T_2Sn(SCH_2COOT)_2$ in which each T, which may be identical or different, represents an alkyl radical with 3 to 20 carbon atoms,

3 such as a propyl, butyl, hexyl, octyl, iso-octyl, decyl, dodecyl or octadecyl radical. By way of illustration, these compounds can correspond to the formula (n-$C_4H_9)_2Sn(SCH_2COO$-iso-$C_8H_{17})_2$ or (n-$C_8H_{17})_2Sn(SCH_2COO$-iso-$C_8H_{17})_2$. The preparation of such compounds is given, for example, in Canadian Pat. No. 846,201 and French Pat. Nos. 1,477,892 and 1,488,631, (2) metal salts of carboxylic acids, more especially of aliphatic or cycloaliphatic acids, such as lead, iron and tin 2-ethyl-hexanoate and lead, cobalt and iron naphthenate, (3) polymers with

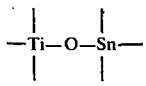

recurring units, which can be prepared by reacting alkyl titanates, the alkyl radical having 3 to 10 carbon atoms, with the organo-tin salts of mono- or poly-carboxylic acids mentioned above. Such polymers are mentioned in French Pat. No. 1,392,648 and British Pat. Specification No. 928,496.

The organic solvents, used in an amount from 500 to 5,000 parts, preferably 800 to 3,500 parts, per 100 parts of dimethylpolysiloxane polymers, may be:

alkanes or cycloalkanes such as hexane, heptane, octane, decane, dodecane, cyclopentane, cyclohexane, methyl-cyclohexane or a petroleum cut containing paraffinic and/or cycloparaffinic compounds;

aromatic hydrocarbons such as toluene, xylene, cumene or tetralin, aliphatic ketones such as methyl ethyl ketone, methyl isopropyl ketone or methyl isobutyl ketone, alkyl esters of monocarboxylic acids such as ethyl acetate or butyl acetate.

The silicate esters which, together with the organic derivatives of titanium, are the essence of this invention are used in an amount from 1 to 15 parts, preferably 2 to 12 parts, per 100 parts of dimethylpolysiloxane polymers. They may be:

silicates of the formula: $Si[(OCH_2CH_2)_aOR]_4$ in which R represents an alkyl radical with 1 to 4 carbon atoms, namely methyl, ethyl, propyl and butyl radicals. By way of illustration, these silicates can correspond to the formulae below: $Si(OCH_2CH_2OCH_3)_4$, $Si(OCH_2CH_2OC_2H_5)_4$, $Si(OCH_2CH_2OC_3H_7)_4$, $Si(OCH_2CH_2OC_4H_9)_4$, $Si[(OCH_2CH_2)_2OCH_3]_4$ and $Si[(OCH_2CH_2)_2OC_2H_5]_4$, and cyclic silicates of the formulae

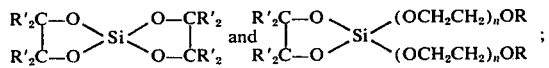

in which R' may represent, for example, a methyl, ethyl, propyl, isopropyl, butyl or pentyl radical. Specific examples include:

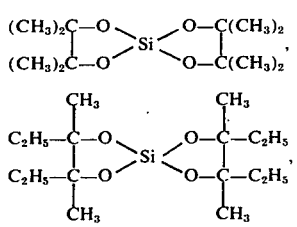

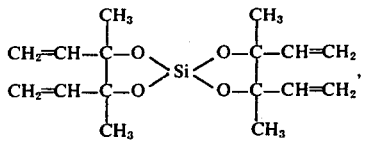

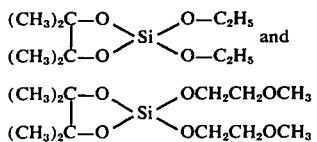

The preparation of these silicates does not present any major problem; generally they can be obtained by reacting an alkyl or alkoxyalkyl orthosilicate with a tertiary α-glycol, in an appropriate molar ratio. Details about the preparation of these silicates are given in, for example, French Pat. No. 1,543,493.

The organic derivatives of titanium, the other compounds which characterise the invention and which are used in an amount from 5 to 25 parts, preferably 6 to 22 parts, per 100 parts of dimethylpolysiloxane polymers, may be:

alkyl polytitanates of the average general formula $Ti_bO_c(OR'')_d$ in which R'' represents, in particular, a propyl, isopropyl, butyl, pentyl, hexyl or octyl radical. These alkyl polytitanates are polymers resulting from the partial hydrolysis of titanates of the formula $Ti(OR'')_4$; they can have a linear structure or a more complex structure as indicated in "The Organic Chemistry of Titanium" by R. Feld and P. L. Cowe, pages 25 to 31. The structure of these polymers depends, in particular, on the molar ratio of the starting reagents, i.e. alkyl titanate/water, on the nature of the radicals R'' and on the conditions under which the hydrolysis is carried out. These polytitanates can be characterised by their alkoxy group content bonded to titanium atoms, but it is frequently easier to refer to their titanium oxide content. They should be stable and, moreover, soluble in hydrocarbon solvents such as toluene, xylene and methylcyclohexane in an amount of at least 50 parts per 100 parts of solvent.

and mixtures consisting of at least 5 percent, preferably at least 10 percent, of these polytitanates with alkyl titanates and/or titanium chelates. The alkyl titanates contain alkyl radicals with 3 to 10 carbon atoms, in particular, propyl, isopropyl, butyl, pentyl, hexyl, 2-ethyl-hexyl, octyl and decyl radicals.

Examples of such alkyl titanates include isopropyl titanate, butyl titanate, 2-ethyl-hexyl titanate and octyl titanate.

The titanium chelates which may be used include those prepared g. by simply mixing beta-diketones or beta-keto esters with the above alkyl titanates, in a molar ratio of 1/1 or 2/1. These chelates are described, in particular, in the "The Organic Chemistry of Titanium", loc. cit., pages 58 to 66, or h. by reacting dialkoxy-titanium chelates prepared according to g) with alkane-diols. These chelates are described in French Pat. No. 2,121,289.

As chelates prepared according to g), liquid products of products which have relatively low melting points are preferably used, such as those corresponding to the following formulae:

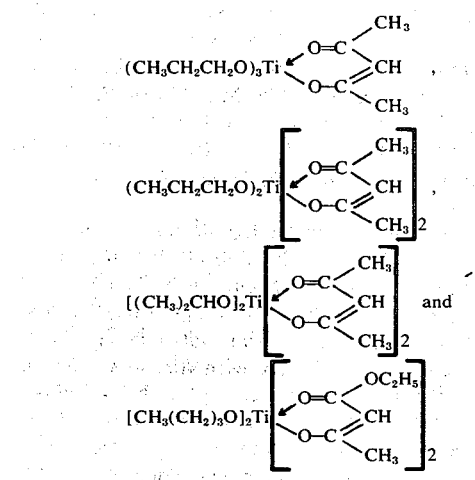

The chelates prepared according to h) include those corresponding to the following formulae:

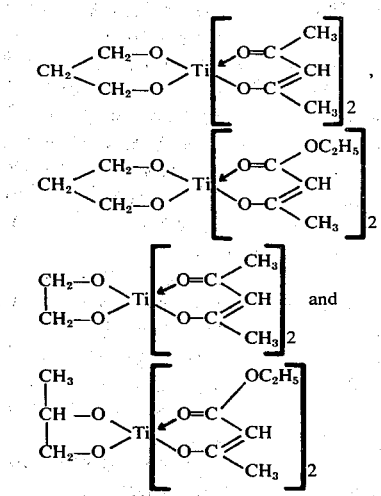

The compositions of the present invention can be prepared by simply mixing the solvent with the other ingredients, at ambient temperature. However, in order to make it easier to produce homogeneous and stable mixtures, it is frequently preferable first to add the dimethylpolysiloxane polymers to all or to a part of the solvent, and then to add the silicate esters, the organic derivatives of titanium, the catalysts and the remainder, if any, of the solvent.

It is also possible to prepare before hand two solutions which are very stable on storage, one consisting of all or of the majority of the solvent and the dimethylpolysiloxane polymer, and the other consisting of the remaining ingredients optionally containing a sufficient amount of solvent to assist their mixing; these two solutions are then mixed at the time of use in suitable proportions.

The compositions of the present invention are generally stable when stored for several weeks in closed containers and for at least 24 hours in open containers in contact with the atmosphere; moreover, they have the advantage of being practically insensitive to the impurities which usually contaminate coating tanks such as metal particles, incrustation residues and residues resulting from other types of composition. They can be applied to the substrates to be treated with the aid of the usual devices such as those using a knife or a smoothing bar. However, as indicated above, they are particularly suited to be used on industrial coating machines which operate at high speed, and in this case they are then applied by, for example, the so-called "gravure Roll" or "Reverse Roll" system.

Once deposited on the substrate, the composition can be dried and cured by simply being left in the atmosphere for a few hours. However, because they are prepared for use on industrial machines, they are dried and cured in a few seconds on these devices by being passed through ovens heated to, for example, 60° – 210°C. The time taken to pass through these ovens generally varies from 2 to 30 seconds; this depends on the length of the ovens and on the speed at which the coated substrates travel, it being possible to use speeds exceeding 200 metres/minute.

The amount of composition deposited on the substrates can vary, it most frequently ranges from 3 to 30 g/m². It depends on the proportion of organosilicon compounds in the composition, on the nature of the support to be treated, and on the desired non-stick properties.

Thus a porous paper manufactured from a pulp which has not been refined to any great extent requires the use of larger amounts of composition with a particular organosilicon compound content than does a paper which cannot be greased, manufactured from a very refined pulp, it being understood that the non-stick properties desired are the same for both papers. Furthermore, the amounts of organosilicon compound forming the non-stick coatings are different depending on whether, for example, separable supports for self-adhesive labels are being manufactured or on whether materials intended for packaging very sticky materials such as bitumen or tars are being treated; in the first case, the non-stick character is adjusted to prevent the labels from becoming detached too easily from their support, and in the second case the best possible non-stick properties are required to assist the removal of the sticky materials.

The organosilicon compounds are generally present in an amount from 0.05 to 5 g/m² on the coated substrate.

The compositions of this invention can be applied to virtually any material which will subsequently be in contact with tacky, sticky, viscous, gluey or pasty substances, or substances which give off moisture. These porous or non-porous synthetic or cellulosic materials thus may be any variety of paper, such as Kraft paper which can be refined to any desired extent, glassine paper and papers treated with sulphuric acid, cardboard, vegetable parchment, papers coated with polyethylene, sheets of regenerated cellulose such as cellophane or of cellulose polyacetate, plastics sheets such as those made of polyethylene and polypropylene, metal foils, woven fabrics based on synthetic fibres, glass or asbestos, and non-woven fibrous materials based on cellulosic fibres or on synthetic fibres or on mixtures thereof.

The materials which have thus been rendered non-stick may be used as, for example, spacers, separating supports, transfer papers and films, and packagings for sticky materials such as confectionery, cakes, crude rubbers, tars and bitumen, waxes, or foodstuffs which give off moisture such as fish and meat.

The following Examples further illustrate the present invention. Parts are expressed by weight.

EXAMPLE I

A bath N is used which comprises:

100 parts of a gummy mixture (prepared as described below) of dimethylpolysiloxane polymers, of Williams plasticity 150, containing 0.0055 percent by weight of hydroxyl groups bonded to silicon atoms, 4.3 parts of (beta-methoxy)-ethyl silicate of the formula $Si(OCH_2CH_2OCH_3)_4$, 10.5 parts of butyl polytitanate containing 33 parts by weight of titanium oxide, 2.3 parts of dibutyl-tin dilaurate and 1,570 parts of xylene.

To prepare this bath, the xylene and the gummy mixture are first introduced, with stirring, into a suitable container, and then, after producing a homogeneous solution, the mixture consisting of (beta-methoxy)-ethyl silicate, butyl polytitanate and dibutyl-tin dilaurate is added.

This bath is divided into 8 substantially equal fractions and a different support is treated with each of the first 4 fractions, namely:

a Kraft paper $P_1$ formed from a pulp refined to 78° Shopper, a polyethylene-layered Kraft paper $P_2$, manufactured by extruding a 15 micron thick polyethylene film onto a raw Kraft paper, a slightly porous Kraft paper $P_3$, formed from a pulp refined only to 30° Shopper and a sheet $P_4$ made of regenerated cellulose. The other 4 fractions are stored in containers open to the atmosphere.

This coating treatment is carried out only on one of the two faces of the abovementioned supports and is effected by means of a gravure roll mounted on an industrial paper coating machine. The quantities of bath N deposited amount to 5 g/m² on the materials $P_1$, $P_2$ and $P_4$, and to 10 g/m² on the material $P_3$.

The coatings are dried and cured simultaneously by passing the coated materials through a 15 m long tunnel-oven; the treatment temperature is 150°C in the case of the supports $P_1$ and $P_3$, and 110°C in the case of the supports $P_2$ and $P_4$, and the drying time, which elapses between entering and leaving the oven, is 5 seconds at 150°C and 6 seconds at 110°C.

An adhesive tape of the sparadrap type is applied to the coated face of the support and the force necessary to detach the tape from the support is measured by means of a tensometer. In order to make this measurement, a free end of the tape is folded over at 180° and this end is pulled at the rate of 25 cm/minute. In every case, adhesive force lying within the range 2 g – 3 g for a tape width of 1 cm is found; the coatings formed thus possess good non-stick characteristics, no matter what their support may be.

Moreover, when the surface of these coatings is simply rubbed with the thumb, no removal of surface layers occurs.

Furthermore, in order to investigate the migration of the silicones, present in these coatings, towards the adhesive, the adhesive tapes which have just been used as well as new adhesive tapes are applied to degreased aluminium plates, and the adhesive forces are measured as before. Forces of the order of 1,000 g for a tape width of 1 cm are found for all the tapes, whether or not they have been used previously.

Following the same procedure as has just been described, the 4 remaining fractions are used after they have been left in contact with the atmosphere for 24 hours; it is found that the coatings deposited on the supports $P_1$, $P_2$, $P_3$ and $P_4$ have substantially the same physical characteristics as those shown above by the coatings formed from the 4 fractions of freshly prepared bath N.

By way of comparison, in the formulation of the bath N above, the 100 parts of the gummy mixture of dimethylpolysiloxane polymers are replaced by 100 parts of an α,ω-dihydroxydimethylpolysiloxane oil of viscosity 500,000 cPo at 25°C, and the materials $P_1$, $P_2$, $P_3$ and $P_4$ are treated immediately with this new bath, in accordance with the above process; the physical characteristics of the coatings produced are then investigated; it is then seen that the coatings deposited on the supports $P_1$, $P_2$ and $P_4$ show poor resistance to rubbing with the thumb.

Also by way of comparison, in the formulation of the bath N, the 10.5 parts of butyl polytitanate are replaced by 10.5 parts of butyl titanate, and the abovementioned materials $P_1$, $P_2$, $P_3$ and $P_4$ are treated immediately with a fraction of this new bath, in the way described above. The coatings produced have physical characteristics similar to those shown by the coatings formed from the bath N. The other fraction is stored in a container which is open to the atmosphere and is examined after being left for 24 hours; it is seen that it is cloudy and contains numerous gelled aggregates; it thus cannot be used for the coating treatment.

Again by way of comparison, in the formulation of the bath N, the 4.3 parts of (beta-methoxy)-ethyl silicate are replaced by 4.3 parts of ethyl silicate, and the materials $P_1$, $P_2$, $P_3$ and $P_4$ are treated with this new bath, in accordance with the process already indicated. The coatings produced are not sufficiently cured and show poor physical characteristics.

The gummy mixture of dimethylpolysiloxane polymers is prepared in the following way: 1,000 g of anhydrous octamethylcyclotetrasiloxane are introduced into a closed 2 l flask in which there is an atmosphere of dry nitrogen, and are heated to 160°C; 10 mg of potassium hydroxide are then added and the temperature of 160°C is maintained, with stirring, for 30 minutes. At this stage, the mixture has the appearance of a gum; 50 mg of water are then introduced and the contents of the flask are kept at a temperature of 160°C for 3 hours. After this period of time, the gummy mixture is neutralised by means of a stream of carbon dioxide and is left to cool at atmospheric pressure, whilst being protected by a gentle stream of anhydrous nitrogen.

EXAMPLE II 9 different baths, $B_1$, $B_2$, $B_3$, $B_4$, $B_5$, $B_6$, $B_7$, $B_8$ and $B_9$ are used, each consisting of:

100 parts of a gummy product chosen from amongst:

An α,ω-dihydroxydimethylpolysiloxane gum of viscosity 20 million cPo at 25°C, prepared by removing, at 160°C and under a pressure of 5 mm of mercury, the volatile products present in the gummy mixture described in Example 1, and the gummy mixture of Example 1, 2.6 parts of a silicate ester chosen from amongst the silicates of the formulae:

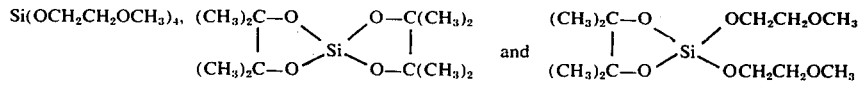

66.6 parts of a butyl polytitanate containing 33 percent by weight of titanium oxide, 5 parts of an organic derivative of titanium, chosen from amongst isopropyl titanate, butyl titanate and chelates of the formulae:

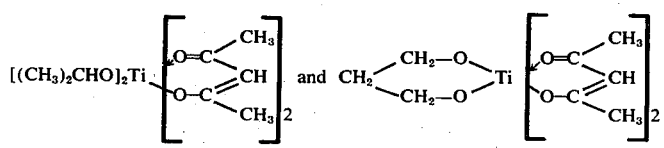

2.3 parts of a catalyst chosen from amongst dibutyl-tin di-(2-ethyl-hexanoate), dioctyl-tin maleate, the compound corresponding to the formula (n-$C_8H_{17})_2Sn(SCH_2COO$-iso-$C_8H_{17})_2$, iron 2-ethyl-hexanoate and lead 2-ethyl-hexanoate, 230 parts of toluene and 1,300 parts of methyl ethyl ketone.

In order to prepare these baths, the gummy product is first dissolved in the mixture of the solvents (toluene and methyl ethyl ketone except for 16 parts of the latter), and then the mixture consisting of the silicate ester, butyl polytitanate, the organic derivative of titanium, the catalyst and the 16 remaining parts of methyl ethyl ketone is introduced.

The procedure as described in Example 1 is then followed, dividing each bath into 8 substantially equal fractions and treating the 4 types of supports with 4 fractions which have just been prepared and with 4 fractions which have been aged for 24 hours by being left in containers open to the atmosphere.

It is found that the coatings produced are resistant to rubbing with the thumb, that the baths are stable for at least 24 hours and that there is no migration of the silicones forming the coatings into the adhesive of the sparadrap tapes; moreover, in every case, the non-stick characteristics are good.

The table below gives, for each bath, besides the butyl polytitanate and the 2 solvents, the nature of the 4 other ingredients of which it is composed; the average values for the adhesive forces in g/cm of the adhesive tapes on these coatings are also given, whether the latter are formed from freshly prepared baths or from baths which are 24 hours old.

|  | $B_1$ | $B_2$ | $B_3$ | $B_4$ | $B_5$ | $B_6$ | $B_7$ | $B_8$ | $B_9$ |
|---|---|---|---|---|---|---|---|---|---|
| Gummy polymer of Example 1 | X | X | X | X |  |  |  | X |  |
| α,ω-Dihydroxydimethylpolysiloxane gum of viscosity 20 million cPo at 25°C |  |  |  |  | X | X | X |  | X |
| $Si(OCH_2CH_2OCH_3)_4$ | X |  | X |  | X |  | X | X |  |
| $(CH_3)_2C$-O, $(CH_3)_2C$-O / Si \ O-$C(CH_3)_2$, O-$C(CH_3)_2$ |  | X |  | X |  | X |  |  |  |
| $(CH_3)_2C$-O, $(CH_3)_2C$-O / Si \ $OCH_2CH_2OCH_3$, $OCH_2CH_2OCH_3$ |  |  |  |  |  |  |  |  | X |
| Isopropyl titanate |  | X |  |  |  |  | X |  |  |
| Butyl titanate | X |  |  |  | X |  |  |  | X |
| $[(CH_3)_2CHO]_2Ti$ chelate |  |  | X |  |  |  |  | X |  |
| $CH_2$-O Ti chelate |  |  |  |  |  | X | X |  |  |
| Dibutyl-tin di-(2-ethyl-hexanoate) | X |  |  | X |  | X |  |  |  |
| Dioctyl-tin maleate |  | X |  |  |  |  |  |  | X |
| (n-$C_8H_{17})_2Sn(SCH_2COO$-iso-$C_8H_{17})_2$ |  |  | X |  | X |  |  |  |  |
| Iron 2-ethyl-hexanoate |  |  |  |  | X |  |  |  |  |
| Lead 2-ethyl-hexanoate |  |  |  |  |  |  |  | X |  |
| average of the values for the adhesive forces in g/cm $P_1$ | 4 | 6 | 6 | 5 | 4 | 5 | 4 | 6 | 3 |
| $P_2$ | 3 | 5 | 5 | 3 | 3 | 4 | 3 | 4 | 3 |
| $P_3$ | 7 | 8 | 8 | 7 | 8 | 9 | 8 | 7 | 8 |
| $P_4$ | 3 | 3 | 5 | 3 | 3 | 4 | 3 | 3 | 3 |

I claim:

1. A non-stick coating composition produced by mixing the following ingredients, parts and percentages being by weight:
   i. 100 parts of a dimethylpolysiloxane which is:
      a. an α-ω-dihydroxydimethylpolysiloxane gum having a viscosity of at least about 1 million centipoises at 25°C, or
      b. a mixture consisting of at least 75% of a said gum and a low molecular weight dimethylpolysiloxane polymer formed during the preparation of a said gum by polymerisation of a dimethylcyclopolysiloxane in the presence of an alkaline or acid catalyst,
   ii. 1 to 15 parts of a silicate ester which is selected from c. an alkoxyalkyl silicate of the formula: Si[-(OCH$_2$CH$_2$)$_a$OR]$_4$ in which R represents an alkyl radical with 1 to 4 carbon atoms and a is 1 or 2, and d. a cyclic silicate of the formula:

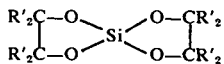

or

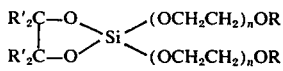

in which each R', which may be identical or different, represents an alkyl group with 1 to 5 carbon atoms or a vinyl group, n is zero or 1 and R is as defined above.

iii. 5 to 25 parts of an organic derivative of titanium which is selected from:

e. an alkyl polytitanate which is soluble in hydrocarbon solvents, having the average general formula Ti$_b$O$_c$(OR'')$_d$ in which R'' represents an alkyl group with 3 to 8 carbon atoms, b represents an integer of at least 2, c represents an integer of at least 1 and d represents an integer of at least 4, and f. a mixture consisting of at least 5 percent of a said alkyl polytitanate with an alkyl titanate, the alkyl group having 3 to 10 carbon atoms, and/or a titanium chelate:

iv. 0.3 to 8 parts of an organic derivative of tin, a metal salt of a carboxylic acid or a polymer possessing recurring units of the formula:

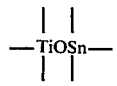

as catalyst, and v. 500 to 5,000 parts of an organic solvent.

2. A composition according to claim 1 in which the silicate ester has the formula:

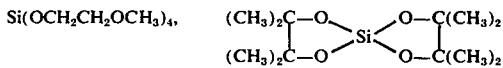

or

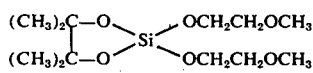

3. A composition according to claim 1 in which the organic derivative of titanium is a butyl polytitanate containing 33 percent by weight of titanium oxide or a mixture thereof with isopropyl titanate, butyl titanate or a chelate of the formula:

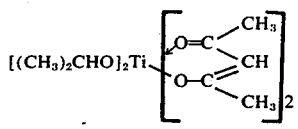

or

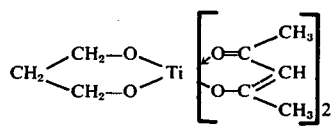

4. A composition according to claim 1 which consists, per 100 parts of dimethylpolysiloxane, of 2 to 12 parts of the silicate ester, 6 to 22 parts of the organic derivative of titanium, 0.5 to 6 parts of the catalyst and 800 to 3500 parts of the solvent.

5. A composition according to claim 4 in which the silicate ester is selected from the formulae:

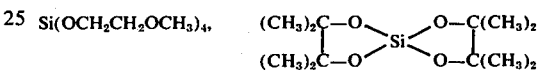

and

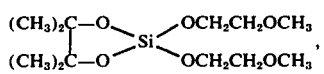

the titanium derivative is selected from butyl polytitanate containing 33 parts by weight of titanium oxide, isopropyl titanate, butyl titanate and chelates of the formulae:

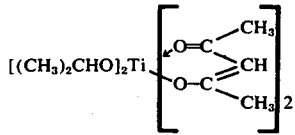

and

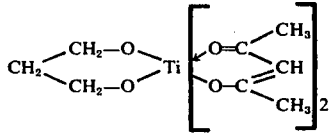

and the catalyst is selected from dibutyl tin dilaurate, dibutyl tin di(2-ethyl-hexanoate), dioctyl tin maleate, iron 2-ethyl-hexanoate, lead 2-ethyl-hexanoate and the compound of formula: (n-C$_8$H$_{17}$)$_2$Sn(SCH$_2$COO-iso-C$_8$H$_{17}$)$_2$.

* * * * *

UNITED STATES PATENT OFFICE
CERTIFICATE OF CORRECTION

Patent No. 3,926,896  Dated December 16, 1975

Inventor(s) Jean DUMOULIN

It is certified that error appears in the above-identified patent and that said Letters Patent are hereby corrected as shown below:

After "[30] FOREIGN APPLICATION PRIORITY DATA", change "Mar. 21, 1973  France.........73.10098" to --Mar. 21, 1973  France.........73.10097--.

Signed and Sealed this eighth Day of June 1976

[SEAL]

Attest:

RUTH C. MASON
Attesting Officer

C. MARSHALL DANN
Commissioner of Patents and Trademarks